(12) United States Patent
Grossman

(10) Patent No.: US 6,457,923 B1
(45) Date of Patent: Oct. 1, 2002

(54) BARREL NUT

(75) Inventor: Joel Grossman, Selangor (MY)

(73) Assignee: Grossman Product Services Sdn. Bhd., Kuala Lumpur (MY)

( * ) Notice: Subject to any disclaimer, the term of this patent is extended or adjusted under 35 U.S.C. 154(b) by 0 days.

(21) Appl. No.: 09/760,747

(22) Filed: Jan. 17, 2001

(51) Int. Cl.$^7$ .............................. F16B 37/00; F16B 39/00
(52) U.S. Cl. .................... 411/104; 411/169; 411/427; 411/973
(58) Field of Search ................................ 411/104, 169, 411/427, 973, 84

(56) References Cited

U.S. PATENT DOCUMENTS

| D33,198 S | * | 9/1900 | Hart et al. ............... 411/169 X |
| 2,654,923 A | * | 10/1953 | Johnson .................. 411/104 X |
| 3,473,431 A | * | 10/1969 | King, Jr. ................. 411/169 X |
| 4,498,271 A | * | 2/1985 | Koniger et al. .......... 411/104 X |
| 4,820,096 A | * | 4/1989 | Knight ....................... 411/169 |

* cited by examiner

Primary Examiner—Neill Wilson

(74) Attorney, Agent, or Firm—John A. Castellano

(57) ABSTRACT

A nut, including a body further including a threaded cylindrical hole, for receiving a threaded member, an axis of the threaded cylindrical hole being substantially parallel to a longitudinal axis of the body and a protrusion, grippable between a thumb and forefinger, extending from the body in a longitudinal direction, where the protrusion may be manipulated to position the body to engage the threaded member with the threaded cylindrical hole. A method of securing two members, including inserting a threaded member into a hole in one of the two member, inserting a nut including a body including a threaded cylindrical hole, for receiving a corresponding threaded member, an axis of the threaded cylindrical hole being substantially parallel to a longitudinal axis of said body and a protrusion, grippable between a thumb and forefinger, extending from said body in a longitudinal direction, into a first hole in a second of the two members such that the protrusion remains substantially outside of the first hole, inserting the threaded member into a second hole substantially perpendicular to and intersecting with the first hole in the second of the two members, manipulating the protrusion to position the body of the nut to engage the threaded member with the threaded cylindrical hole and tightening the threaded member to secure the two members.

21 Claims, 17 Drawing Sheets

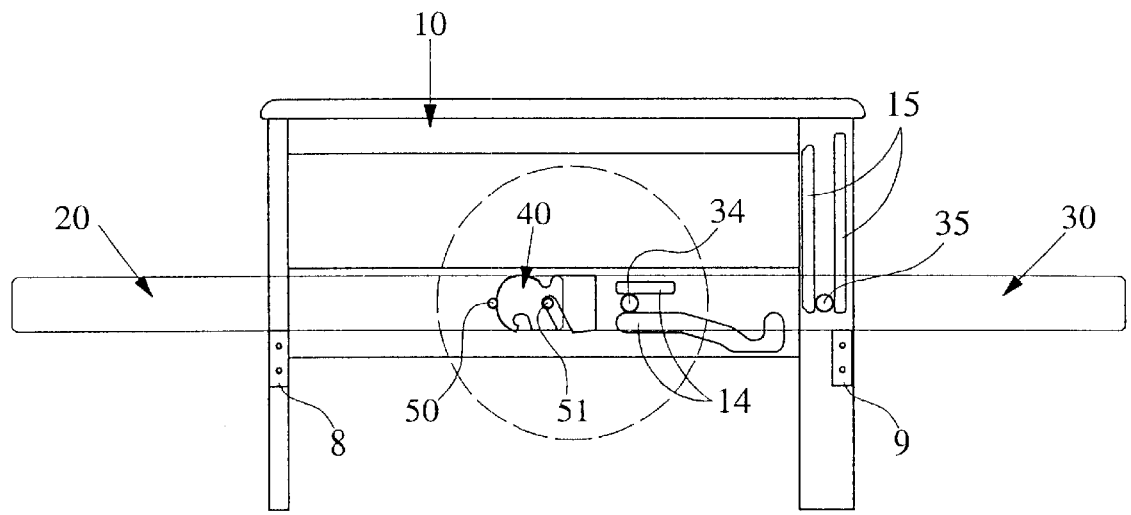
Figure 9a(1) : Position I
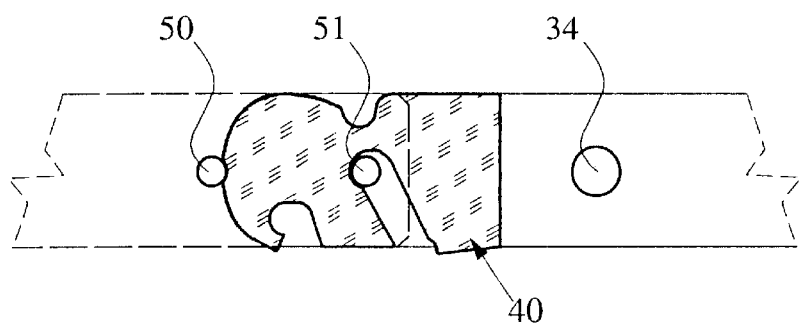
Figure 9a(2)

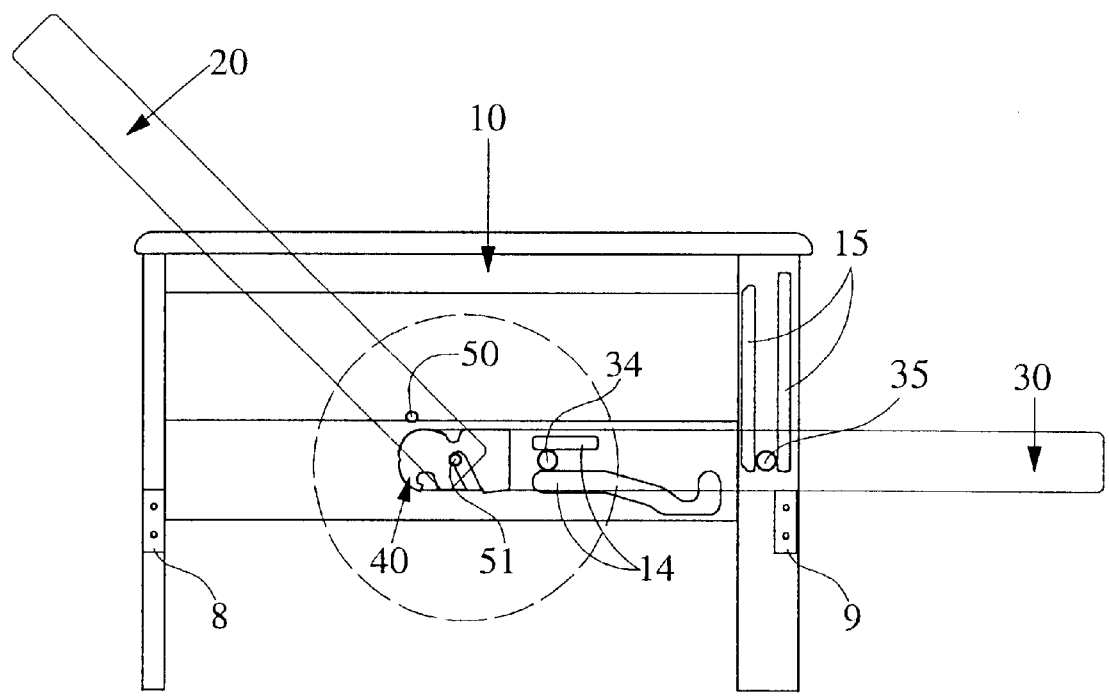
Figure 9b(1) : Position II
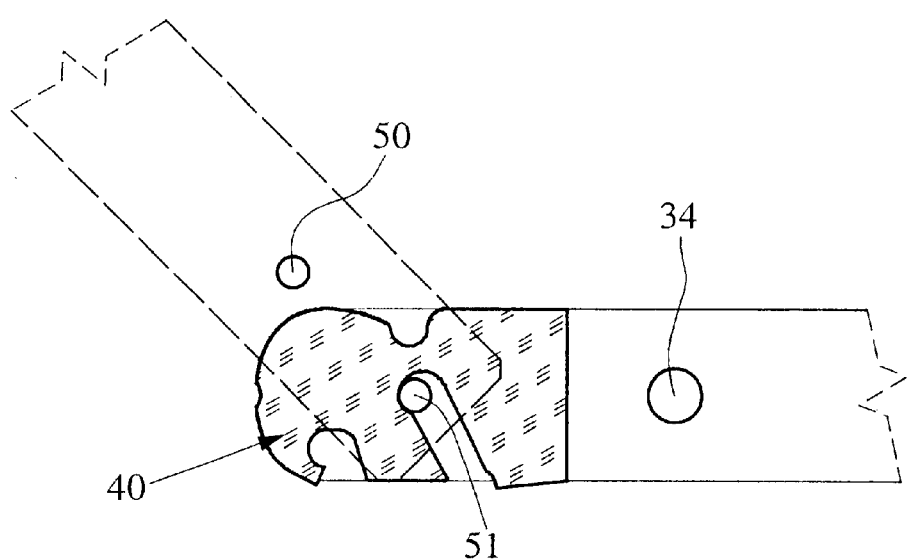
Figure 9b(2)

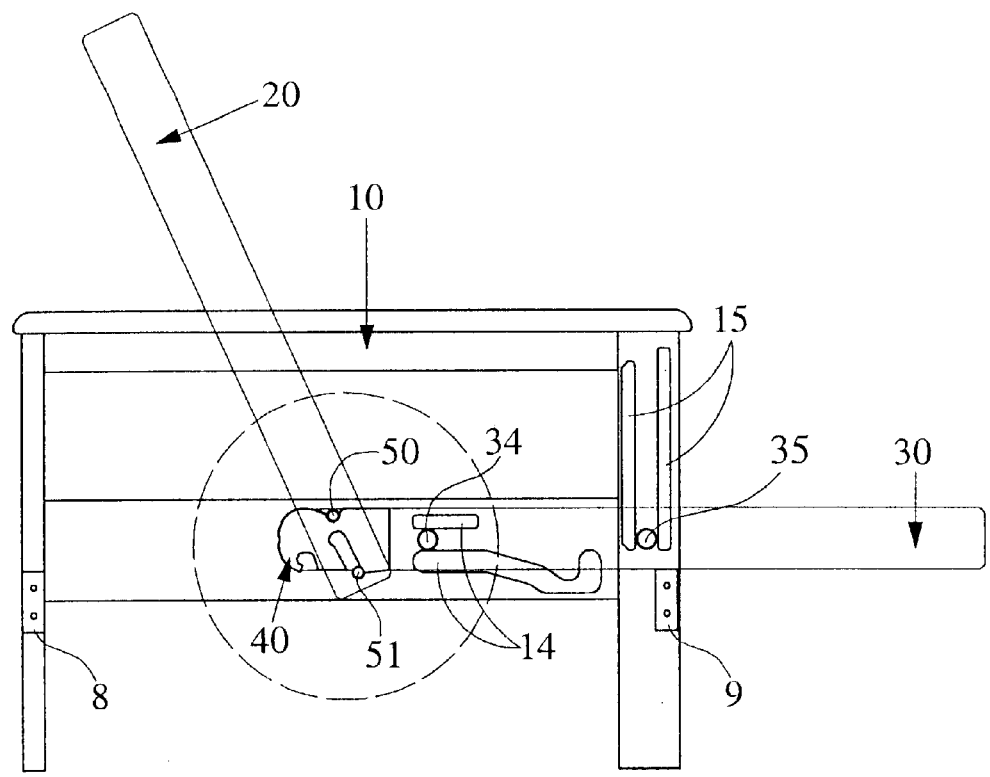
Figure 9c(1) : Position III
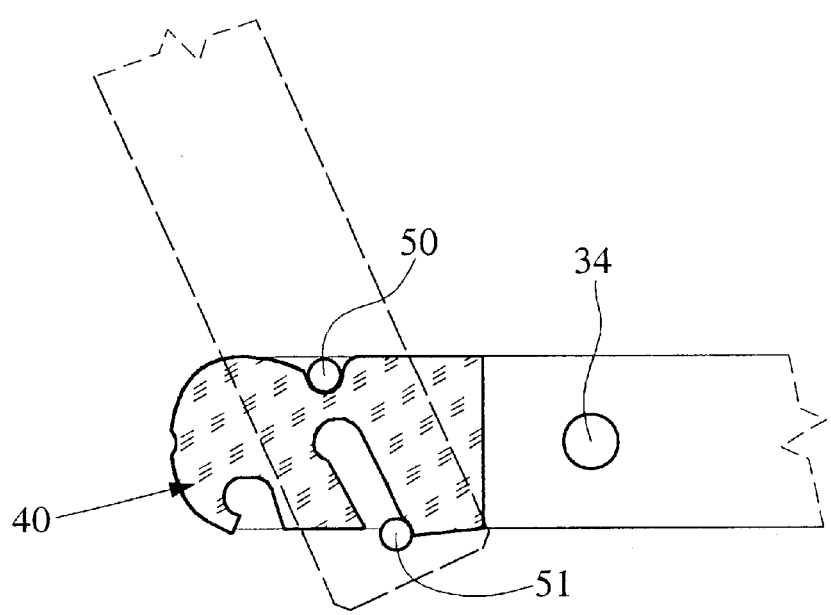
Figure 9c(2)

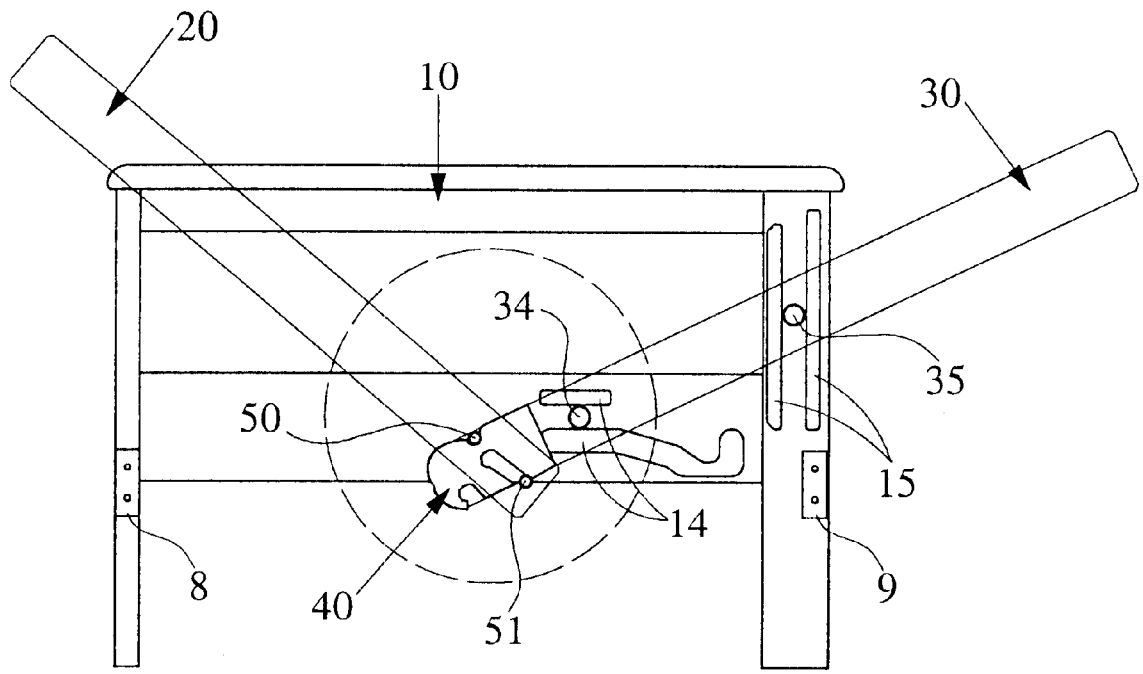
Figure 9d(1) : Position IV
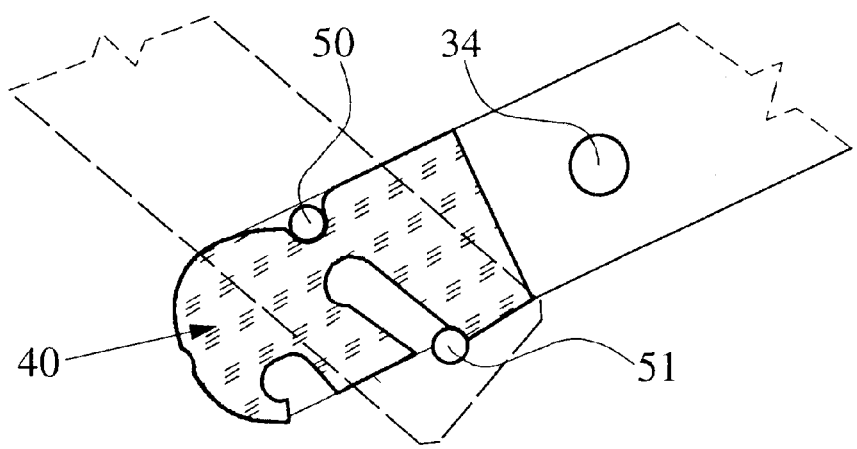
Figure 9d(2)

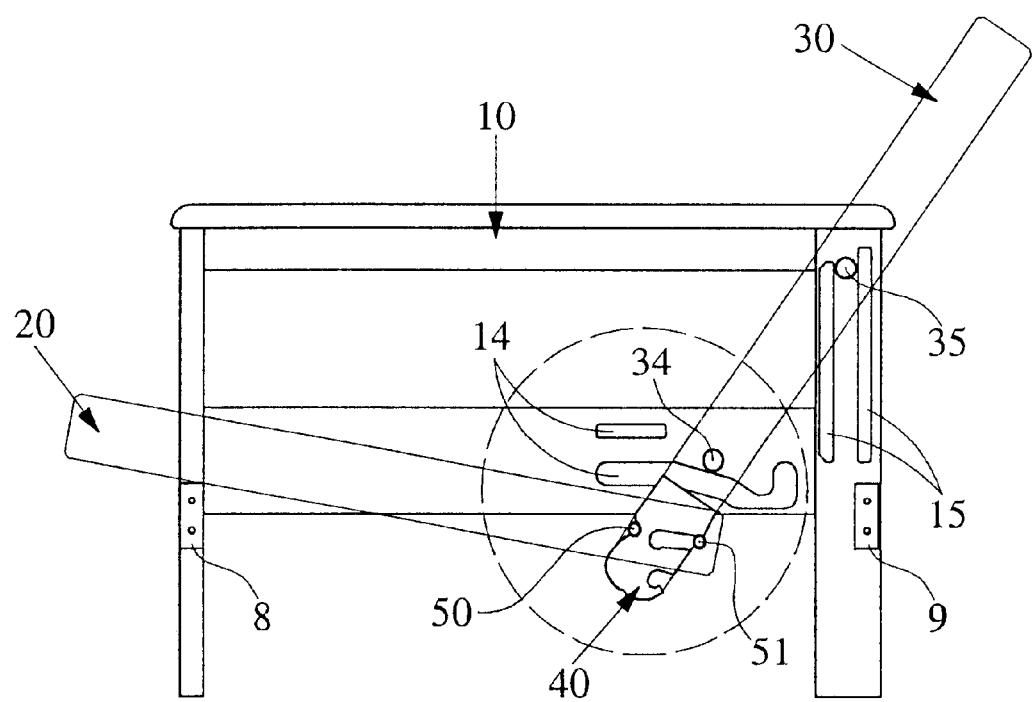
Figure 9e(1) : Position V
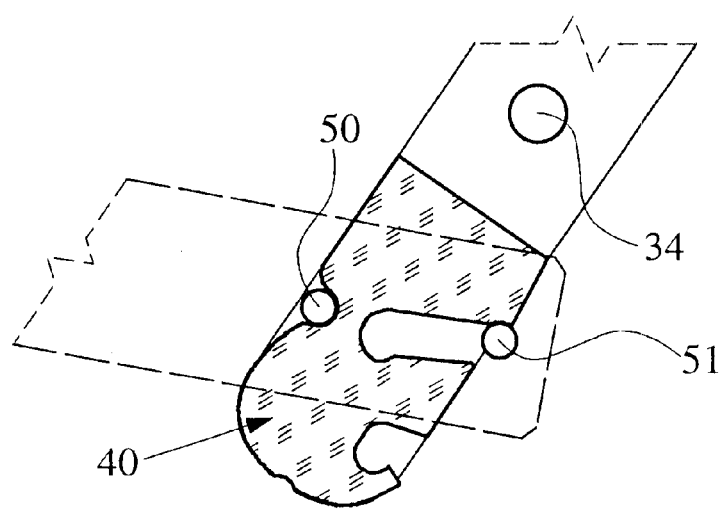
Figure 9e(2)

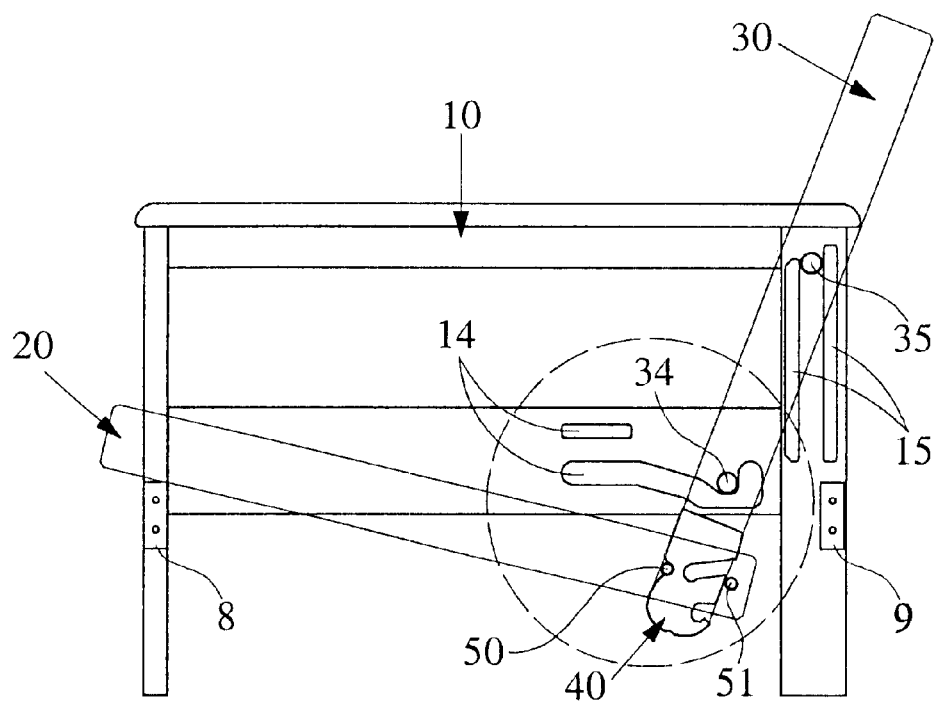
Figure 9f(1) : Position VI
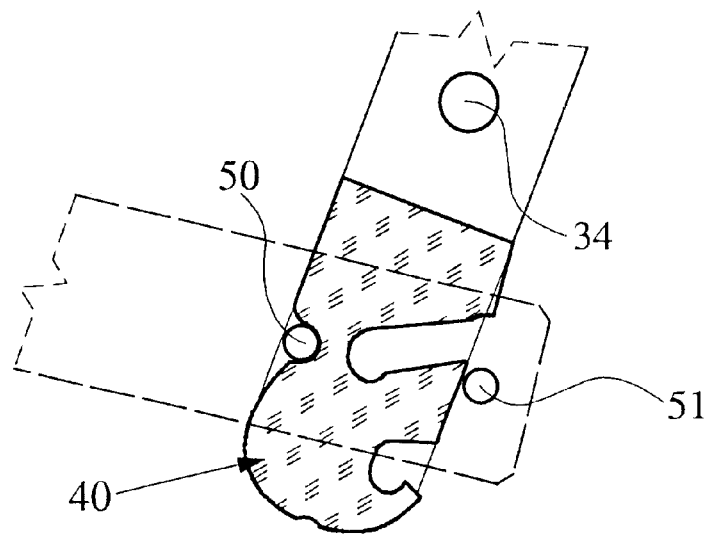
Figure 9f(2)

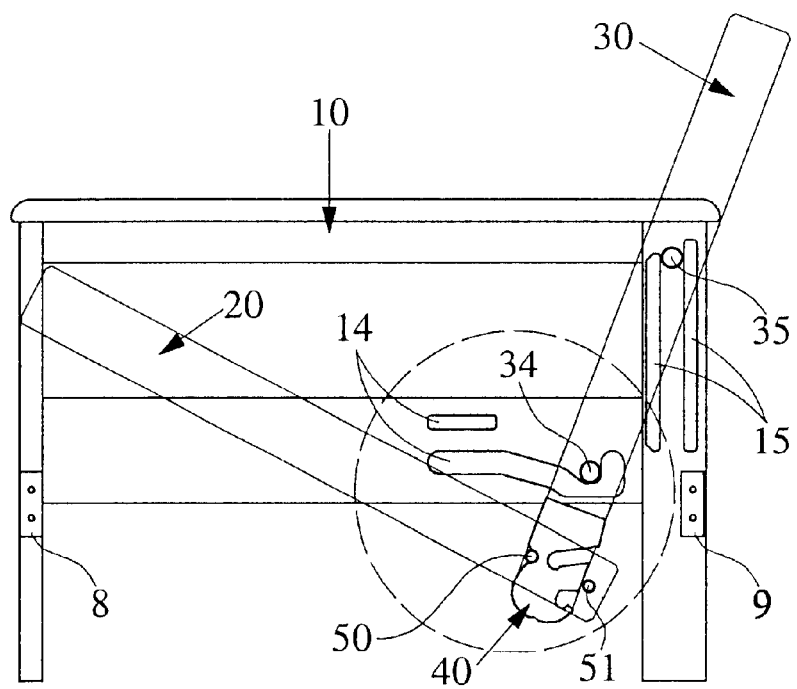
Figure 9g(1) : Position VII
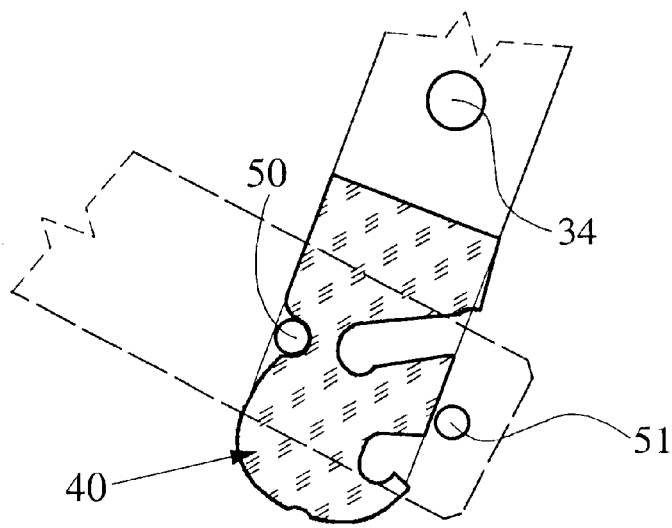
Figure 9g(2)

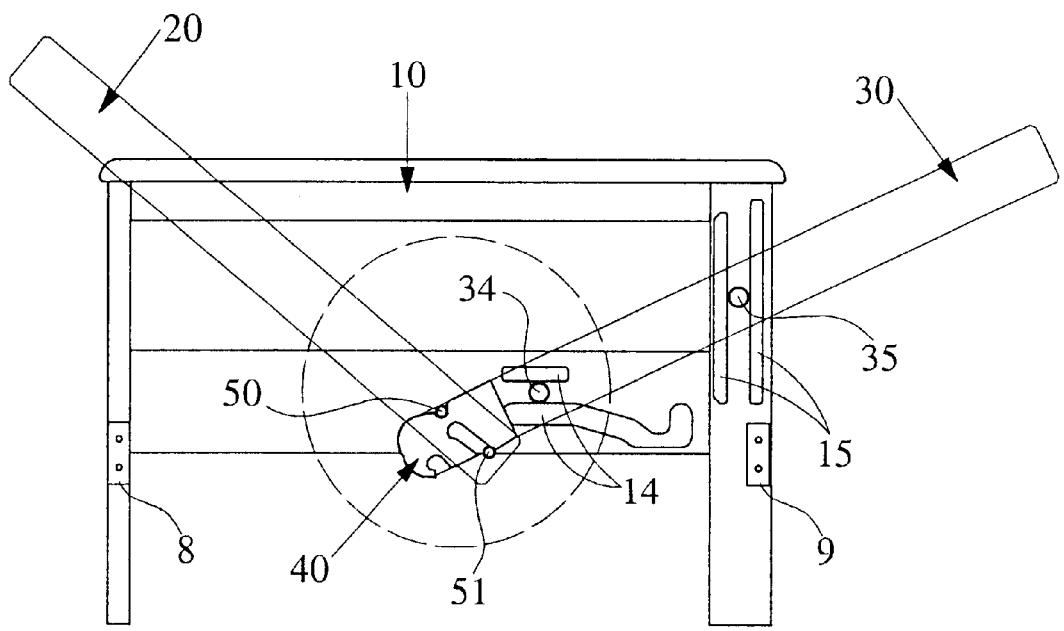
Figure 9h(1) : Position VIII
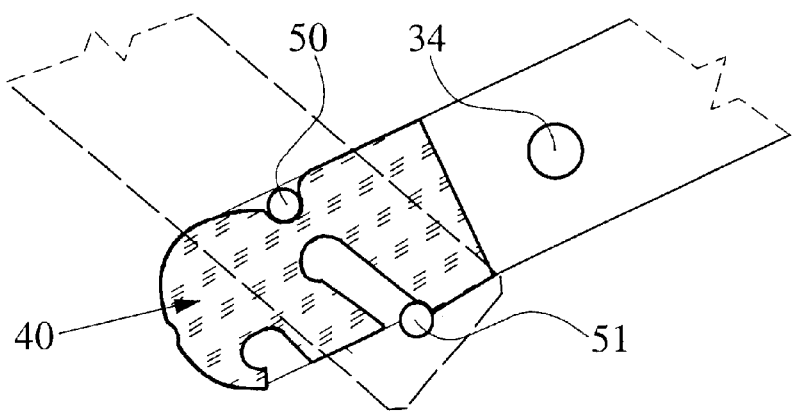
Figure 9h(2)

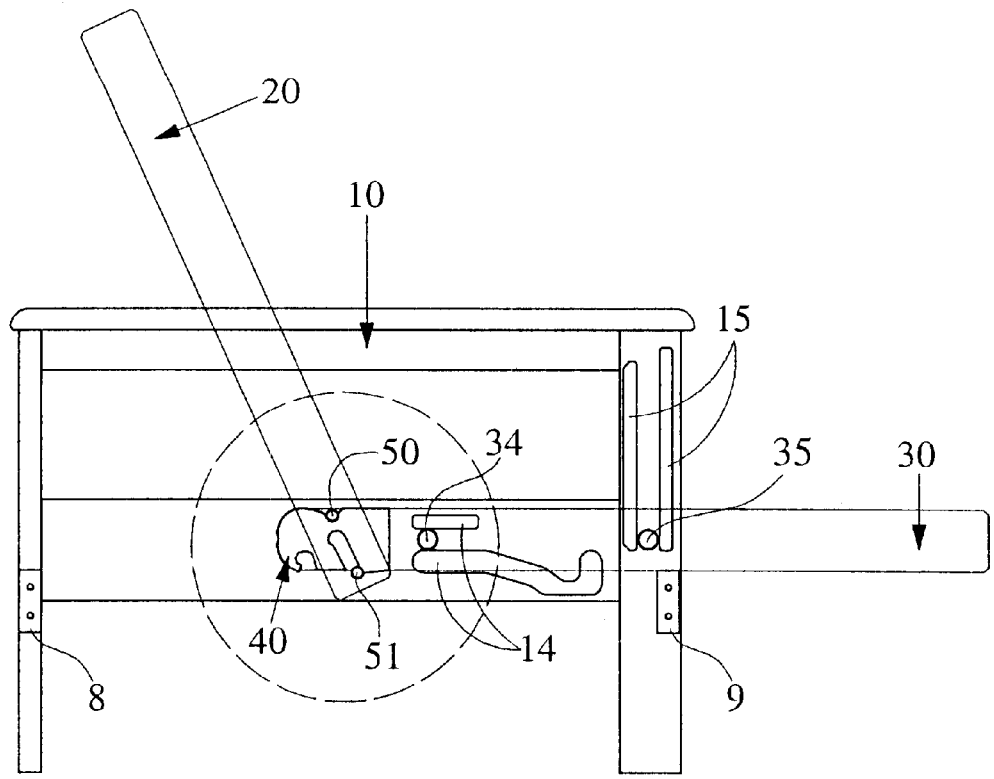
Figure 9i(1) : Position IX
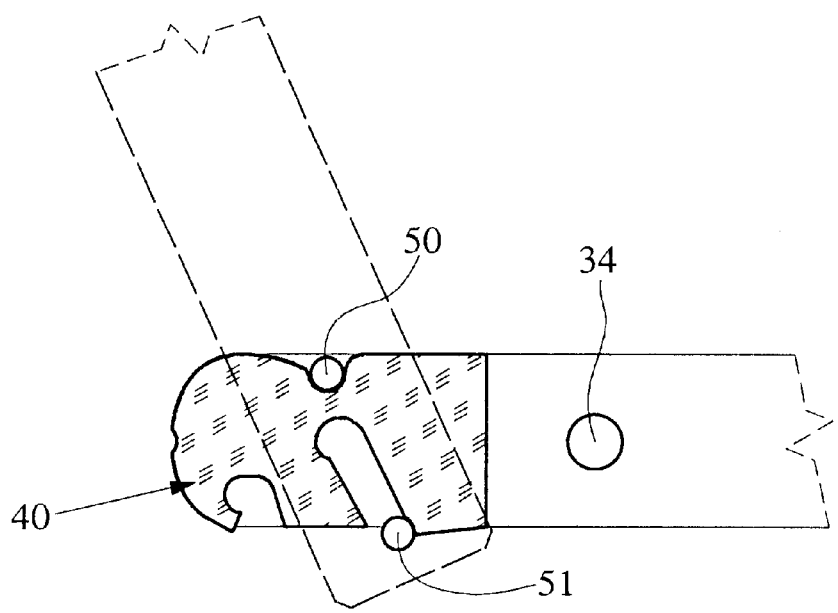
Figure 9i(2)

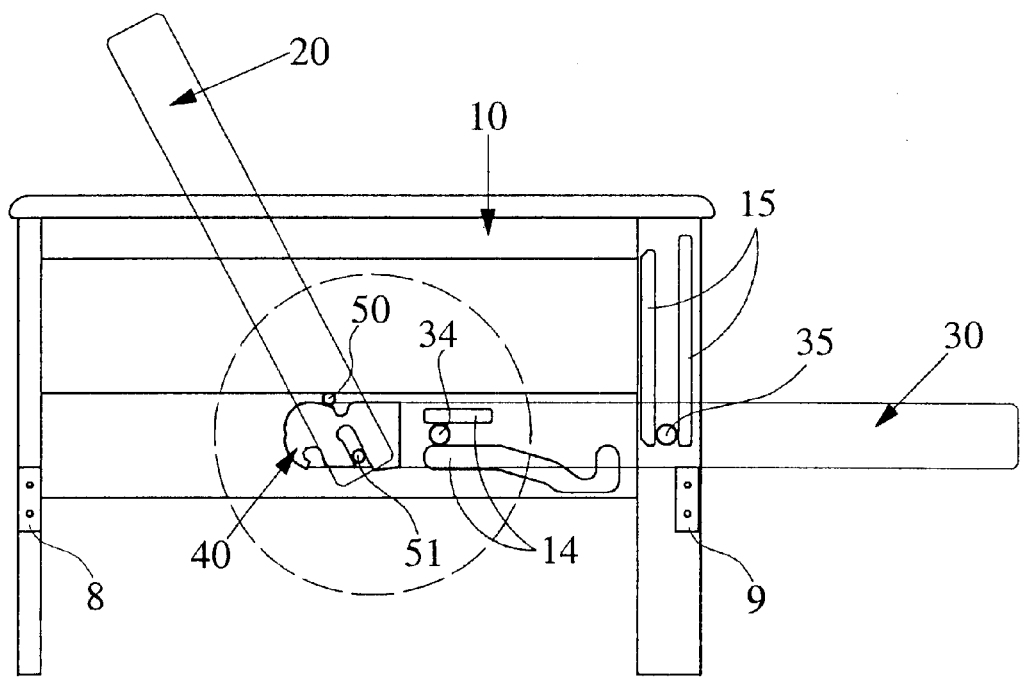
Figure 9j(1) : Position X
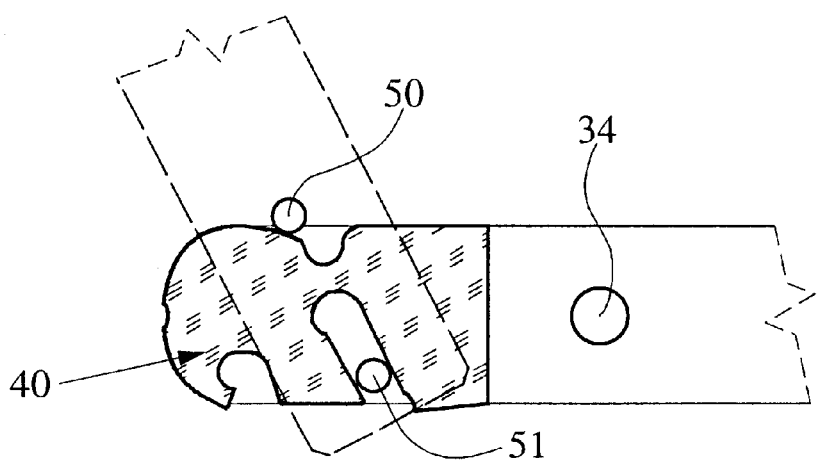
Figure 9j(2)

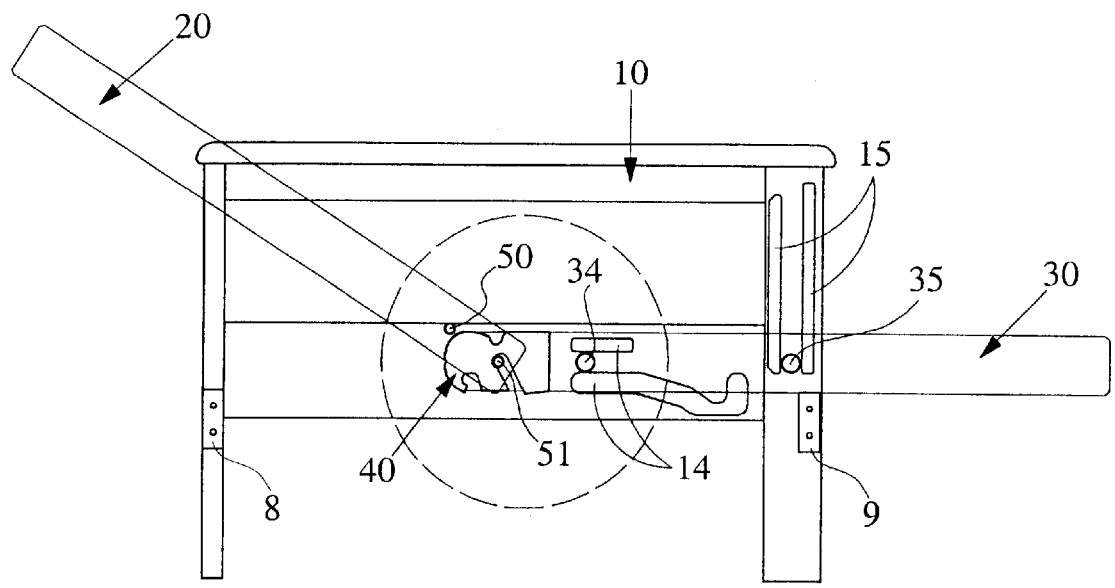
Figure 9k(1) : Position XI
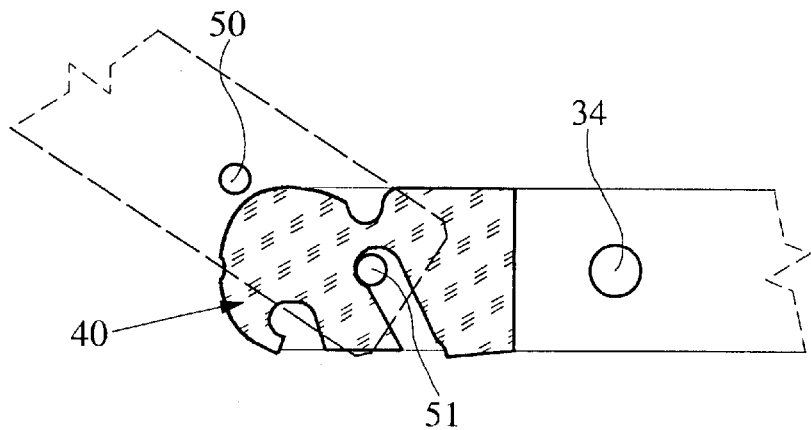
Figure 9k(2)

BARREL NUT

BACKGROUND

The futon sofa bed has grown from a small and simply made item to a larger market product with a greater breadth of styling, function and appeal. Along with its growth has been an increased need for better quality styling and finishes as well as a need for enhanced user friendliness in several aspects of the product. Among these aspects are:

1. Improved ease of conversion from a sofa (seating) position to the bed position and back to the sofa position; and
2. Easier user-assembly of the frame.

The following addresses these two aspects including discussion of problems with the prior art.

Aspect 1: Improved Ease of Conversion and a Discussion of Front Loaders (Prior Art)

The futon sofa bed is a convertible product, converting from a bed position to a sofa position and back again. Accordingly, the futon sofa bed requires moving and mechanical parts to achieve these conversions.

One class of conventional futon frames required the user, when converting, to insert and remove wooden pegs to hold the frame in the seating and bed positions. A later developed class of conventional futon frames permits the back-deck frame to slide using plastic pegs (runners) which run in grooves in the arm-panels, allowing easier movement between the positions of seating and bed. This later developed class is one of the most popular in use today.

However, both classes of conventional futon frames require some strength and care when converting, and can be awkward for the user as example, in the later developed class, when converting from seating to the bed position, care is needed when pulling the seat forward (the primary step in conversion) so as not to let the back-deck come down quickly and slam hard into its horizontal (bed) position, under its own weight. When converting back from the bed to seating positions, the user must first stand at the front of the seat-deck to pull the seat out of its locked position and then move to the back of the frame to lift the back-deck up into a near seating position. Finally the user must return to the front to push the seat deeper into its final seating position.

From its earliest engineering and styling, the futon sofa bed has striven to find simple and economical forms of engineering to achieve these conversions. Simplicity of engineering, and value for money are among the futon sofa bed's strongest defining features.

Unfortunately, the simplicity in the futon sofa bed's engineering designs has not always made the futon sofa bed easy to use (nor has it kept it free from breakage, due to the stresses it endures during use).

To make the product easier to use a number of improvements in the futon sofa bed's converting mechanisms have been made in recent years. These converting mechanisms are commonly known as front converting system, 'front loader', 'kicker', or 'convert-with-ease' to name a few. All these solutions use a system of two points on the seat or back-deck forming a 'lock' onto the other platform (seat or back-deck) so as to lock-and-lever up or down the back-deck into the desired position by moving (levering) the seat-deck, thereby operating only from the front.

While these solutions allow the user to convert from the front with more ease and control, they have a number of flaws and have not become widely used or accepted. Among these flaws are the following:

a. Breakage Due to Metal Pin

The use of small metal pins (for example ⅜" diam.) in wood slots (grooves), which are used both as pivot and 'locking' points, which can cause damage, and often causes breakage to frame components when used. Great stress is put on the contact point between the metal pin and the wall of the wood slot. Because the length of the wood slot runs parallel to the wood grain, the stress often splits the wood.

b. Damage To Wood Slot From Metal Pin

The same metal pins, mentioned above, can leave indentations in the wooden wall of the slot when used under stress. These indentations make smooth movement in the slots increasingly difficult over time.

c. Early Release

When converting from the seating to the bed position, it is easy for the user to pull too hard or too gently forward on the seat-deck. This can cause the 'lock' points to miss and not lock and release too early, causing the back-deck to fall down hard.

d. Jamming

When converting from the sofa position to the bed position, it is easy for the user to pull unevenly forward on the seat-deck. This can cause the 'lock' points to release on one side only and cause the frame to jam as one side releases and the other remains locked. This can cause damage or breakage to the frame.

e. Shortening of the Seat-deck in Seating Position

Because the metal pins are in a fixed position on the back-deck and the slots in the seat-deck slide over them, the nature of this design requires that the seat-deck move deeper in (in towards, and under, the back-deck) when pushed into the final seating position. The sliding of the seat-deck towards and under the back-deck results in the shortening of the seat-deck in the final seating position by about 1½". This is noticeable to the sitter (especially taller ones). It is difficult to try to correct this problem by re-positioning the slot in the seat-deck due to the joining of other frame components in that same area. Alternately, lengthening the seat-deck by 1½" to compensate for the shortened position makes the platform too wide in the bed position.

f. Stress to The Inside Back-deck Long-Rail

Many of these conventional solutions require the inside long-rail of the back-deck to be used as one of the two locking points (catching the seat-deck frame under it as the seat-deck slides under the long-rail in the final seating position). This causes stress and can cause breakage to the long-rail where it joins to the other back-deck frame components.

Additionally, in recent years the futon mattresses used on the frames have become increasingly heavier. The increasing weight of the mattress amplifies the problems listed above.

As a result of the problems listed above the various front converting systems have not been widely accepted in the futon industry. Generally, front converting systems have a reputation for difficulty of use and ease of breakage.

As described above, these front converting improvements have generally employed slots and pins, cut or set into the wooden components. These systems have seen substantial breakage during use due to both the designs of the mechanisms, and due to the materials used. Metal pins forced against wooden grooves and slots also tend to stress and split the wooden components. Attempts have been made to overcome this as in (for example U.S. Pat. No. 5,083,333 to Newton) by using a metal plate stamped with slots and notches to take the force exerted by the metal pins, and thereby relieve the stress on the wooden components.

Although the use of a metal plate can reduce breakage, it has never found broad usage in the futon sofa bed industry partly due to the metal against metal sound/feel effects and other negative metal qualities. Further, the rigid nature of metal has limited potentially desirable features and design improvements to the futon sofa bed conversion mechanism.

Aspect 2: Easier User Assembly of the Frame Parts

The following is a discussion of the three main assembly difficulties:

1. attaching stretchers to arms;
2. attaching the seat-deck to the back-deck; and
3. fitting of seat and back-decks between arms.

a. Attaching Stretchers to Arms

For the majority of futon sofa beds in the market, the standard system of assembly of the stretcher rails (support beams spanning and connecting the arm panels at each end) to the arm panels is by means of threaded bolts which attach and thread into barrel nuts. The threaded bolts are inserted from outside the arm panels, through holes in the arm panels and then into holes drilled in the ends of the stretchers—and then connecting and threading into barrel nuts.

Conventional barrel nuts generally provide slots in the top end of the nut so that the user can use a screwdriver to assist with positioning of the nut within the hole. However, a screwdriver has limited control over the positioning of the nut as it can push the nut deeper into the hole but it can not pull it back out again. A screwdriver can rotate the nut but it can not necessarily rotate the nut at the correct depth inside the hole for correct alignment with the bolt. This is a great drawback of the common barrel nut and causes frustration to the assembler/user.

b. Attaching the Seat-Deck to the Back-Deck

Conventional futon sofa beds utilize a pivot pin to make the connection between the seat-deck and the back-deck and this pin must be fit through a hole in the seat side frame, and align with a hole in the back side frame. The fitting of these pins is awkward and alignment of these holes can be difficult. When fitting the pins into the holes, the back-deck is generally set into it's seating (upright) position between the arm panels and then the seat deck is held manually in place while the pivot pins are inserted.

To add further to this difficult assembly, on occasion, when the design and style of the arm panels are such that they do not provide open access from the outside to these pivot pin holes, and are designed with closed panels that are low enough on the arm to prevent access, the user must assemble the seat-deck to the back-deck completely first, using the pivot pins, before fitting the decks into their position between the arm panels. This requires lifting both decks together as one assembled unit, and with great strength, manipulating the two heavy decks into position.

c. Fitting of Seat and Back-Decks Between Arms

As a converting mechanism the conventional groove and runner system works very well. However, again there are problems in the frame assembly using this system.

The problem comes in when assembling the seat and back decks into the grooves in the arm panels. This assembly requires great care to be taken in the following steps:

1) Assemble Arms to Stretchers

The user starts by assembling the arm panels to the stretcher rails to form the basic framework of the futon frame. The stretcher rails are generally bolted to the arm panels.

2) Leave the Bolts Loose

The bolts must not be tightened at this early assembly stage. The assembler must leave each bolt a few turns loose to ensure a clearance is given when fitting runners into grooves. Although assembly instructions tell the assembler to leave the bolts loose, it is difficult to explain exactly how loose. Additionally, if the bolts are too loose the bolts holding the arms and stretcher may not be securely threaded to hold properly.

3) Fitting the Runners into the Grooves

When the stretchers and arms are attached to each other and the connection between them left loose, the assembler needs to lift the back-deck into place. To do this the assembler must hold the back-deck over the frame and fit the runners at one end of the back-deck into the grooves of the arm panel. Once the runners are in place the assembler must lower the other end of the back-deck carefully, down past the edge of the arm rest of the arm panel, and manipulate the runners at that end into the grooves of the arm panel at that end. This is always a difficult step and can cause damage to finished surfaces of the arm panels. Generally, two people are needed.

Additionally, with some arm panel designs, the seat-deck and the back-deck need to be joined together before fitting the back-deck runners into the grooves (this is true with arm designs that have panels low to the floor not allowing access to the connection point from the outside, thereby requiring the assembler to join the decks before they are fit into the arm panels). This is a dangerous procedure in particular for the exposed finished surfaces and causes damage to the exposed parts.

SUMMARY OF THE INVENTION

With the above-identified problems in mind, the present invention is directed to a futon sofa bed and variations thereon and various assemblies thereof and variations thereon, usable separately or in combination with each other. Several aspects of the futon sofa bed and some assemblies thereof are summarized below.

1. Barrel Nut

A threaded barrel type nut featuring a thumb and finger grip for easy insertion and alignment.

A threaded nut of cylindrical shape with the threaded hole running through, and perpendicularly to the length of the nut.

A threaded nut, designed to insert into a hole in the face of a material, such as (but not restricted to) wood, so that the threaded hole in the nut is in lateral alignment with the lengthwise or widthwise axes of the material, and so that the threaded hole in the nut can be placed in alignment with a threaded bolt, or screw, which can thereby be threaded into the nut when inserted through the edge of the material at a perpendicular (90°) angle to the length of the nut.

A nut, with a thumb and finger grip incorporated at the top end of the nut so the user can easily insert and manipulate the nut inside the hole, in the material, into correct alignment with the threaded bolt for easy threading onto the threaded bolt.

2. Drop-In Assembly of Back-Deck

The present invention is also directed to a futon sofa bed frame featuring a quick assembly system and method for fitting the back-deck into position between the arm panels.

The present invention is also directed to a futon sofa bed frame featuring an open track or ledge fixed on or incorporated into the arm panel onto which the runners or rollers, which are attached to the side rail of the back-deck, drop, and onto which the runners and rollers can be positioned and set directly without the need to fit or key the runners or rollers into grooves inset in the arm panels.

3. Hook-On Assembly of Seat Deck

The present invention is also directed to a futon sofa bed frame featuring a quick assembly system and method for attaching the seat-deck to the back-deck without the need for additional hardware and/or tools.

The present invention is also directed to a futon sofa bed frame featuring a groove, notch or hook (hook-notch) in or on the frame component-parts of one deck (seat or back) that catches a peg, pin or similar piece on the other deck thereby causing the seat-deck to be attached in a simple, hook-on way to the back-deck.

The present invention is also directed to a futon sofa bed frame featuring a hook-notch in or on the frame component-parts which allows the pins or pegs of the other deck to move easily from the assembly hook-notch into their final operating positions for appropriate use.

In one exemplary embodiment, a hook-notch is placed at the inside lower end of the back-deck side frame member so that when the back-deck is laid flat in a horizontal plain (as in the bed position) the opening of the hook-notch is facing downwards.

In one examplary embodiment, a first peg placed at the far end of the seat-deck side frame member, facing outward, so that the user can fit the seat-deck into position between the back-deck side frame members and fit the peg up into the corresponding notch. Additionally, a second peg, forward (towards the front) of the first peg is also located on the seat-deck side frame member. The user lifts the front of the seat-deck so that the first peg remains in the hook-notch, thereby pivoting inside the hook-notch, and the seat-deck is rotated to a near vertical position allowing the second peg to seat in it's corresponding notch at the upper edge of the back-deck side frame. When the second peg is in it's position, the first peg automatically drops out of the hook-notch and is then free to rotate towards the rear and find it's final position in the rear groove.

4. Front Conversion Mechanism

The present invention provides a futon sofa bed that may fully converted between seating and bed positions while standing at the front of the futon frame and a method of assembling a futon sofa bed; and that is easier to manipulate and is more durable when operating than conventional futons.

In particular, the present invention is directed to a futon sofa bed and method featuring a configuration of grooves and retaining edges in and on the back-deck side-rails (or in and on blocks mounted on the back-deck side-rails); and featuring pegs mounted into the seat-deck side-rails. The pegs of the seat-deck side-rails fit into, or on, the above mentioned grooves and retaining edges in the back-deck side-rails.

These pegs are designed to slide inside the grooves and/or along the retaining edges as mentioned above. These pegs are called sliding pegs. The sliding pegs slide into several different positions so as to variably lock, lever and pivot the seat-deck and the back-deck into different positions, relative to each other, and relative to the stationary arm panels, to form appropriate seating and sleeping positions.

With regard to the above mentioned grooves, while the grooves can be routed directly into the wooden frame components, it is preferred that the grooves be made into a separate block of material that can be mounted onto the back-deck side-rail. This block can be made from a multitude of materials including metals, plastics hardwoods and rubber. The preferred material for this discussion is hard rubber. (The use of rubber relieves the problems of breakage as described with conventional designs). The block is then securely mounted with screws to the backdeck side-rail.

A block of moldable material mounted to the frame components of a futon sofa bed and featuring a configuration of grooves, slots, holes, channels, edges and/or notches.

Although the material which the block can be made of can include a multitude of plastics and rubber, I will refer to it here as a rubber block in this discussion as, at this point, rubber is the preferred material due to its high strength, natural elasticity and low cost.

The following are features of a rubber block, used as described above, and in conjunction with pins, pegs, dowels, blocks, rails or other similar devices mounted in the opposite deck (seat or back decks) connected or fit into the rubber block so as to joinably connect the two decks. The following are features of a rubber block which allow for improvements in the mechanics of a futon sofa bed conversion mechanism.

Features of a rubber block (similar to: tire rubber):

a. It won't break, tear or split.

b. It won't substantially wear in use.

c. It is bouncy; it will absorb shock and force of impact.

d. It is elastic; it resists force of pull.

e. It will squeeze, compress and pinch.

f. It can resist pressure at a given point; and it can release its resistance under an increased pressure at the same point.

g. Is moldable and economical.

BRIEF DESCRIPTION OF THE DRAWINGS

FIGS. 9a–9k illustrate the motion in mechanics in one exemplary embodiment of the present invention.

DETAILED DESCRIPTION OF THE INVENTION

1. Finger Held Barrel Nut

Below is described a threaded barrel nut TN 1 which, when used with a threaded bolt TN 13 in the described manner, allows easy insertion, manipulation and alignment as compared to conventional barrel nuts commonly available.

Figure 1:
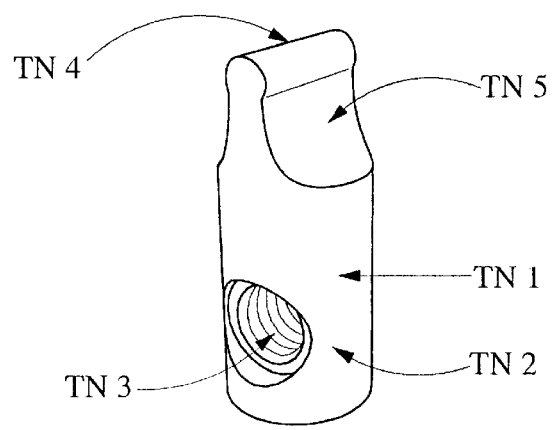
FIGS. 1 through 3 illustrate several views of the barrel nut in one exemplary embodiment of the present invention.
Figure 2:
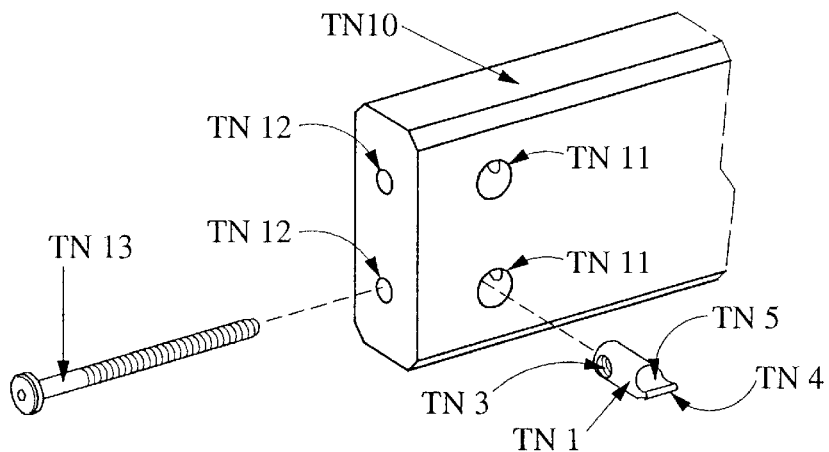
Figure 3:
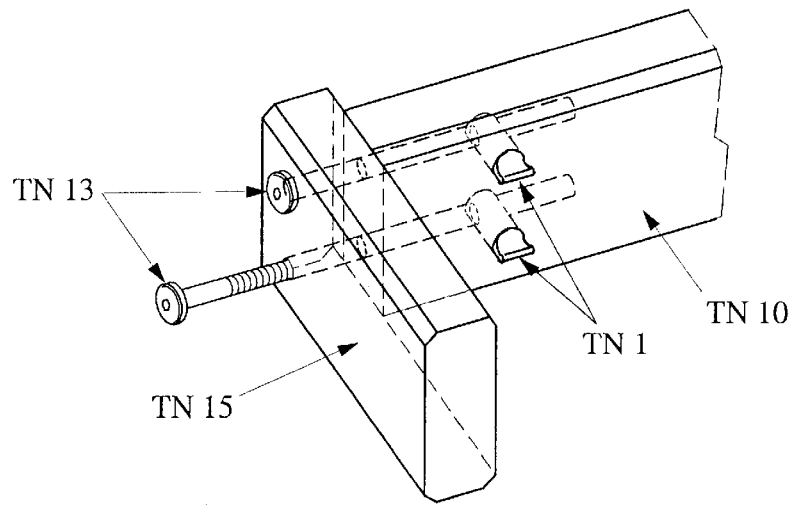

Referring to FIGS. 1–3 a threaded barrel nut TN 1, with a generally cylindrical shape, is formed with a thumb and finger grip TN 4 and TN 5 at one end, with said finger grip designed to extend outside of hole TN 11 (when the barrel nut TN 1 is seated in hole TN 11) and extend beyond the surface of member TN 10. Additionally a threaded hole TN 3 is bored perpendicularly (at a substantially 90° angle) to the length of the cylindrical shank TN 2, and forming a through-hole, preferably open at both ends.

The general purpose of the barrel nut being to fixedly attach any member TN 15 (also being made of a variety of materials, in all shapes and sizes) to member TN 10 by passing bolt TN 13 through both member TN 15 and member TN 10 and by threading bolt TN 13 into barrel nut TN 1, thereby causing it to be screwed into the threaded hole TN 3, and fixedly attaching and tightening together members TN 10 and TN 15.

To practice the present invention, threaded barrel nut TN 1 is held by the user at finger grip TN 4 and TN 5 and inserted into hole TN 11 in material TN 10 so that hole TN 3 in the nut is in open alignment with hole TN 12 in the material, such that the center lines of (and through) the holes TN 3 and TN 12 are substantially along the same axis. A bolt TN 13 is threaded through a hole in material TN 15 and then through hole TN 12 reaching hole TN 3 in barrel nut TN 1 in such a way as to be able to screw the threads of bolt TN 13 into the corresponding threads in hole TN 3 while the user holds finger grip TN 4 and TN 5, thereby easily manipulating (moving the barrel nut TN 1 in and out or slightly tilting the barrel nut TN 1 within the hole) and/or freely turning the barrel nut TN 1 rotationally within hole TN 11 so as to align the holes and threads.

Once conventional barrel nuts are fit into a hole (such as hole TN 11), they are very difficult for the user to manipulate and position into true alignment with a bolt (such as bolt TN 13) as the head of the common barrel nut drops below the surface of material TN 10 and can not be held and easily manipulated by the user.

2. Drop-In Assembly of Back-Deck

Below is described a system of assembly of the futon back-deck 30 into position between the arm panels 10.

Referring to FIGS. 4, 5, 7 and 10 a back-deck 30 with side rails 31a and 31c which include runners 34 and 35 is set in between arm panels 10 while manually held in an approximately vertical position above tracks 14 (on each arm panel 10). Back-deck 30 is manually lowered until runner 34 comes to sit and be supported on track 14. Runner 35 is then lifted and dropped into the slot formed by the mounted front and rear strips comprising track 15. The back-deck 30 is now operational and ready to have the seat-deck 20 attached for use. In one exemplary embodiment, the tracks 14, 15 and runners 34, 35 are plastic. In another embodiment, the track 14, 15 and runners 34, 35 are outside the boundaries of the elements to which they are a part or attached.

3. Hook-On Assembly of Seat Deck

Below is described a system of assembly of the futon seat-deck 20 to the back-deck 30 with ease, and without use of tools or hardware. A purpose of this invention being to allow the user to assemble the seat-deck to back-deck 30 easily without difficulties as earlier described.

Figure 7:
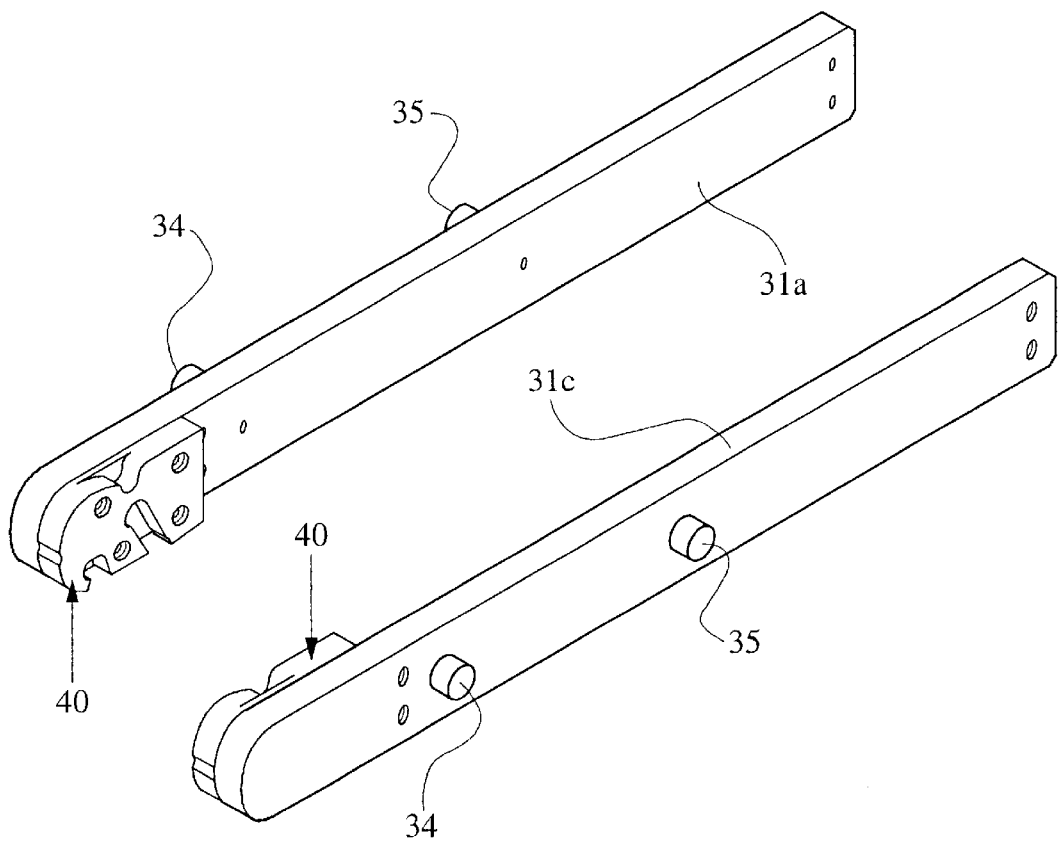
FIG. 7 illustrates a back deck side rail in one exemplary embodiment of the present invention.
Figure 8:
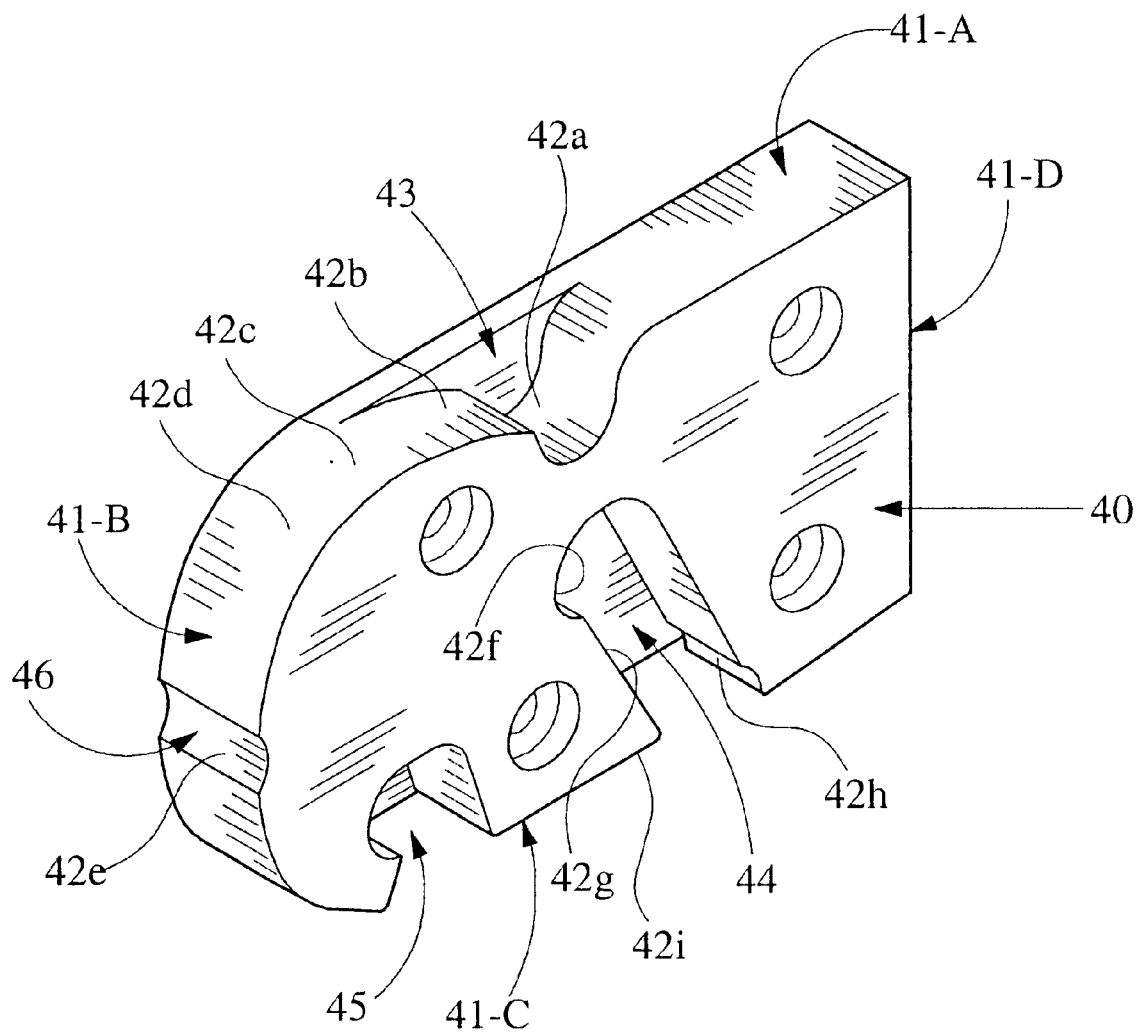
FIG. 8 illustrates a block in one exemplary embodiment of the present invention.
Figure 10:
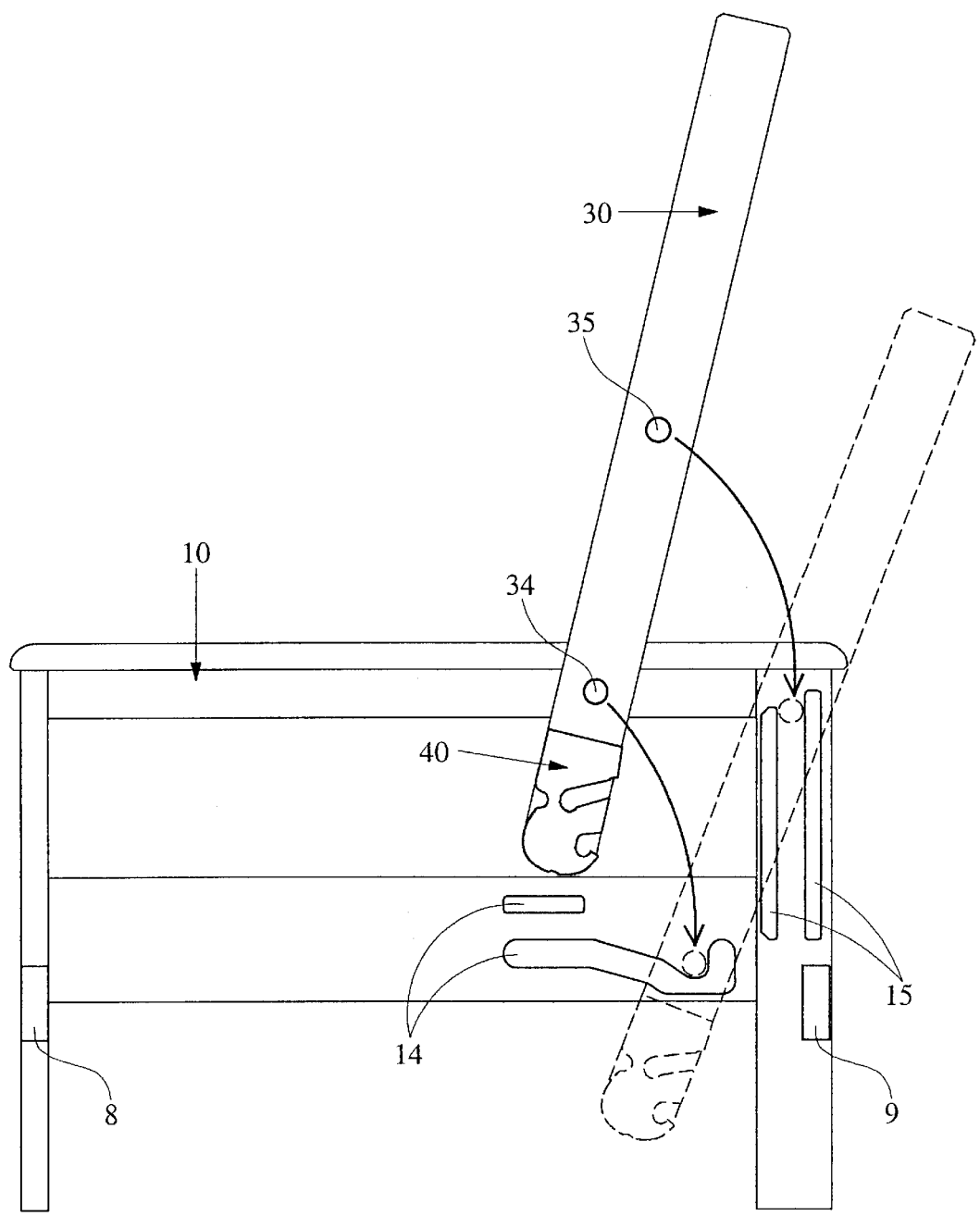
FIG. 10 illustrates a drop-in assembly in one exemplary embodiment of the present invention.

Referring to FIGS. 7 and 8 a notch 45 positioned on block 40 in such a way as to allow sliding peg 51 to enter and be held in notch 45. Sliding peg 51 being held in notch 45 so that the user, while lifting side rail 21a or 21d of seat-deck 20, can support and pivot seat-deck 20 on sliding peg 51 and thereby raise and arc sliding peg 50 over the top of block 40 and bring sliding peg 50 over and down to seat into groove 43.

With sliding peg 50 seated in groove 43 the user can now rotate seat-deck 20 downward, now supported and pivoting on sliding peg 50 in groove 43. With this motion, sliding peg 51 moves out of notch 45 and arcs over to fixed point 42h. The seat-deck 20 is now in the locked position as depicted in FIG. 9c and is ready for standard operation and conversion. The seat-deck 20 is now assembled and attached to back-deck 30.

Disassembly is achieved easily using the same operation in reverse.

4. Front Conversion Mechanism

Figure 4:
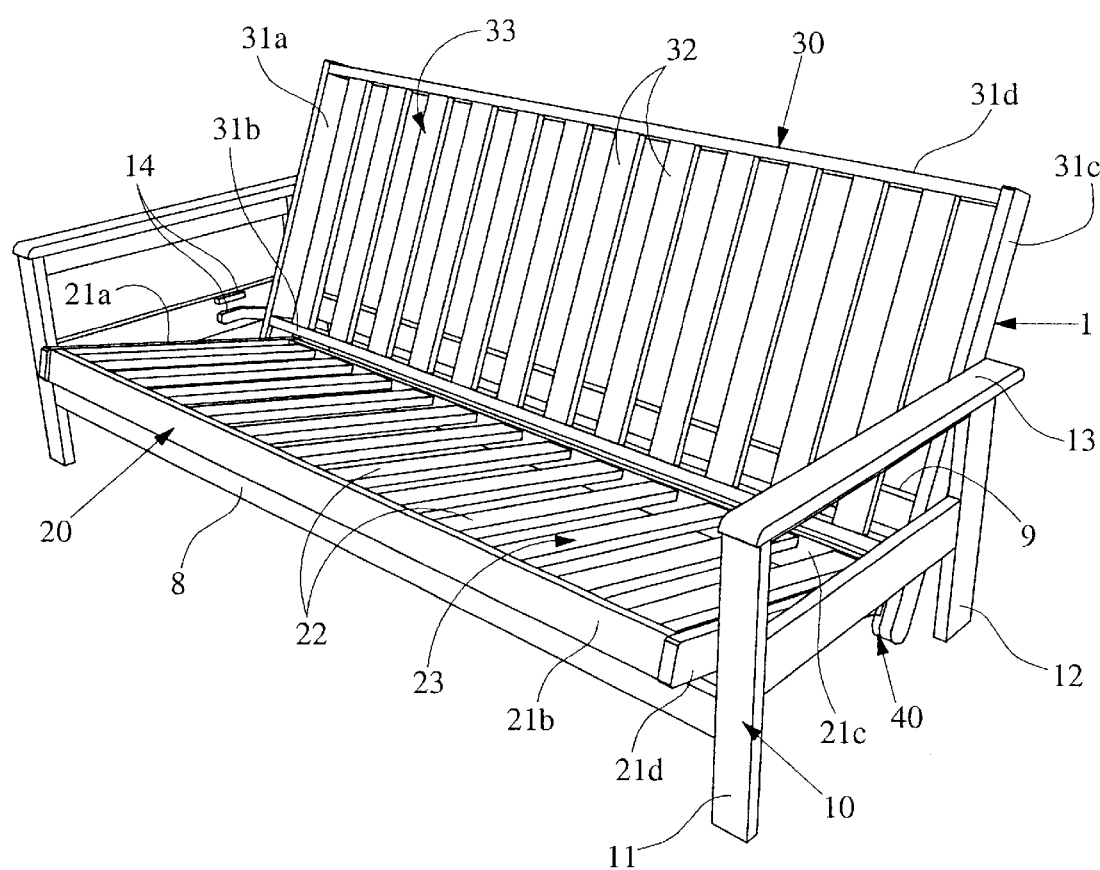
FIGS. 4–5 illustrate views of a futon sofa bed in one exemplary embodiment of the present invention.
Figure 5:
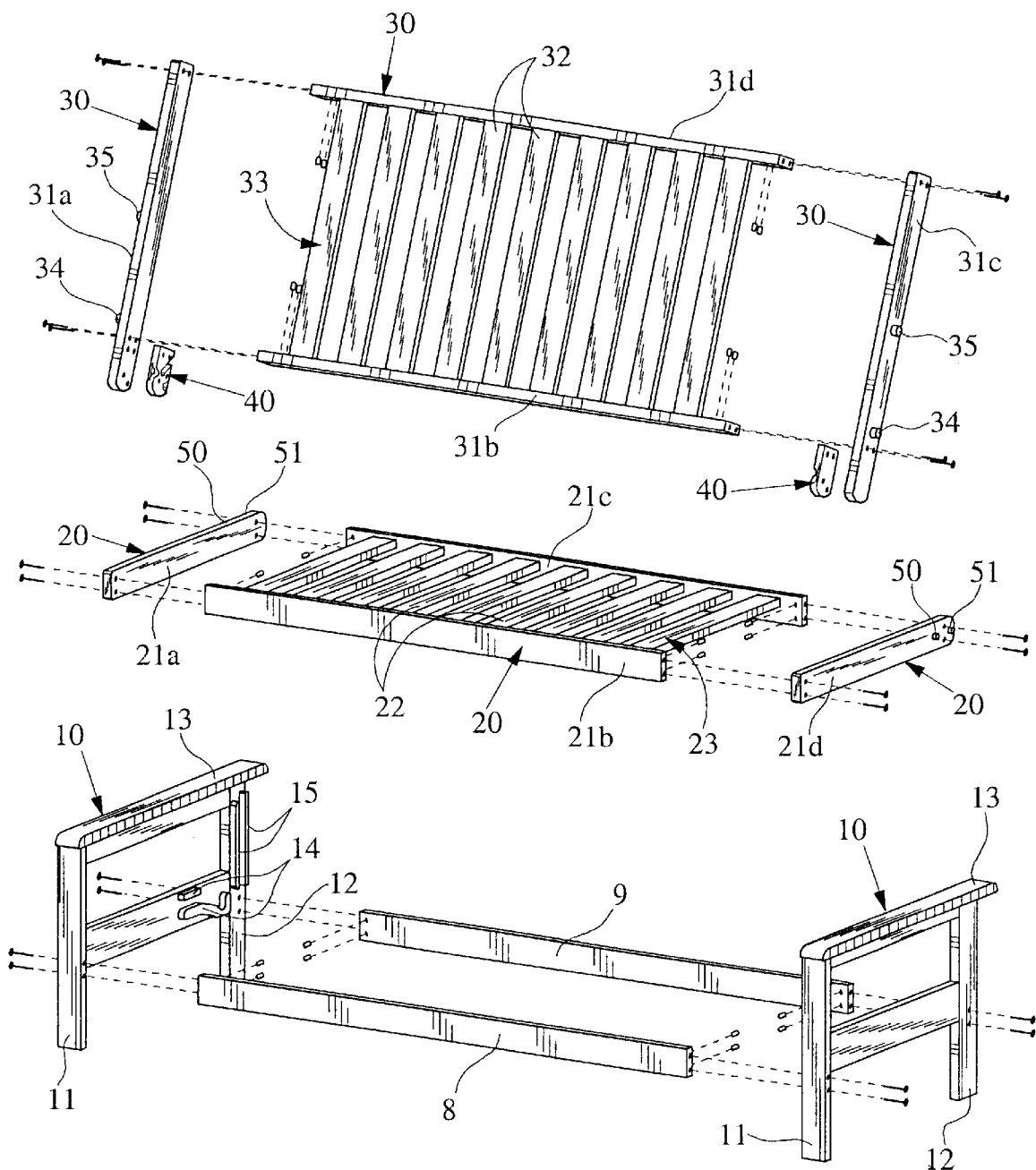

Referring to FIGS. 4 and 5, a wooden futon frame 1 includes a pair of spaced-apart stationary arm panels 10 and a pair of spaced-apart and parallel stretcher rails 8 and 9 extending along a width-wise direction between the stationary arm panels 10. Each stationary arm panel 10 includes a pair of legs 11 and 12 that extend from an arm-rest 13 to the floor. The legs 11 and 12 of each of the stationary arm panels 10 are spaced apart along a depth-wise direction, transverse to the width-wise direction. Stretcher rails 8 and 9 are associated with each stationary arm panel 10 and extend between the legs 11 and 12, parallel to the width-wise direction.

The seat-deck 20 includes a plurality of rails, the ends of which are coupled together, forming a boundary and enclosing a region 23, and a plurality of slats 22. Although the boundary may be of any shape desired, it is preferred that boundary have a rectangular region. To that end, the seat-deck 20 includes four rails 21a, 21b, 21c and 21d. Rails 21a and 21c are spaced-apart and extend parallel to each other, with rails 21b and 21d extending transverse thereto. Rails 21b and 21d are spaced apart and extend parallel to each other. The slats 23 extend between rails 21b and 21d.

The back-deck 30 includes a plurality of rails, which are attached together in a fashion similar to the rails of the seat-deck 20, discussed above. Specifically, the ends of the rails are coupled together, forming a boundary enclosing an area 33, and a plurality of slats 32. Although the area 33 may be of any shape desired, it is preferred that area 33 have a rectangular shape. To that end, the back-deck 30 includes four rails 31a, 31b, 31c and 31d. Rails 31a and 31c are spaced-apart and extend parallel to each other, with rails 31b and 31d extending transverse thereto. Rails 31b and 31d are spaced-apart and extend parallel to each other, with the slats 32 extending between rails 31b and 31d.

The seat-deck 20 is pivotally coupled to the back-deck 30 using the plurality of grooves and pegs of this invention as described in this discussion. The coupling is adapted to allow the frame to move between open and closed positions. In the closed position, seat and back decks 20 and 30 sit in different planes relative to each other with the seat-deck 20 resting on stretcher rail 8 in a roughly horizontal plane. Back-deck 30 sits upright in a roughly vertical plane thereby forming a seating or sofa position. In the fully open position, seat and back decks 20 and 30 lie in a common plane, with the angle therebetween measuring 180°. The back-deck 30 rests on the stretcher rail 9, and the seat-deck 20 rests on the stretcher rail 8.

In conventional futon frames, the conversion of the frame from closed position (seating) to open position (bed) and back again to the closed position is made difficult by the weight of the futon mattress and the weight of the wooden futon frame members, and also by the need for the user to move around the frame, front and back, lifting or pulling, as the user converts the frame though the various converting steps. To provide ease and convenience to the user, it is preferred that the user stand only at the front of futon frame 1 when converting between any and all positions. To further provide ease and convenience to the user it is also preferred that there be the addition of a mechanism to assist the user with the conversion, giving the user more control, and giving more balance to the frame parts by locking seat and back rests 20 and 30 in balanced locked positions relative to each other.

Below are described a rubber block 40 and pegs 50 and 51 which, when combined and operated in the described manner, create a mechanism that allows the user to convert the frame standing only at the front, and convert the frame with more control and ease than conventional futon frames.

Figure 6:
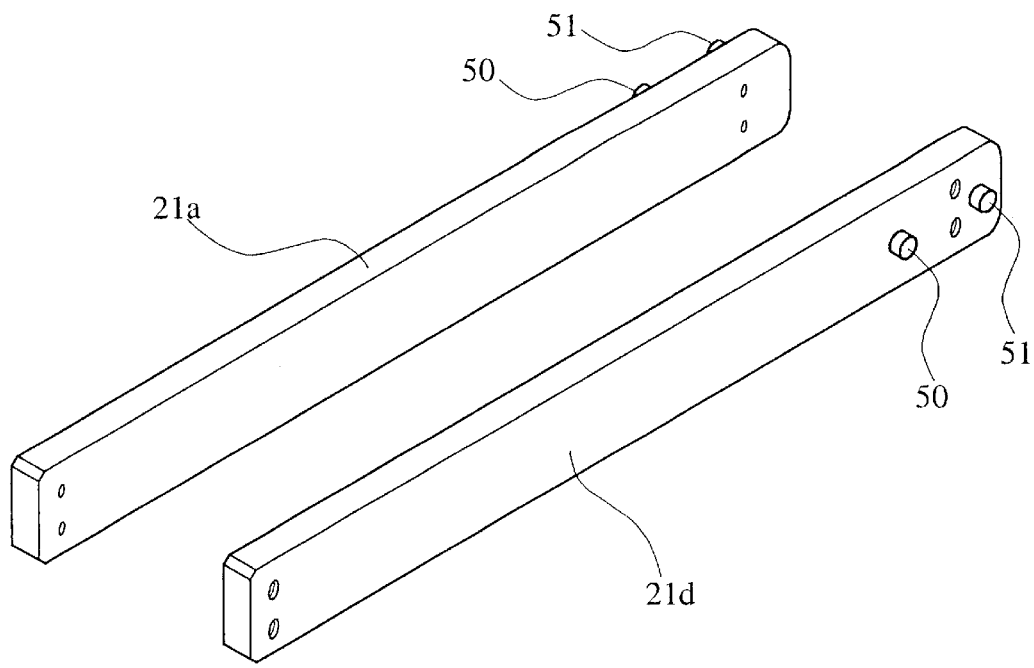
FIG. 6 illustrates a seat deck side rail in one exemplary embodiment of the present invention.

Referring to FIGS. 6 and 8, a rubber block 40, configured with grooves, is mounted on the inside face of the back-deck rails 31a and 31c, fastened with screws or other means, positioned at the far lower end of rails 31a and 31c. Shown more clearly in FIG. 8, the four outer edges of rubber block 40 are identified as 41-A at the top, 41-B at the front, 41-C at the bottom and 41-D at the rear. Additionally a series of fixed points are indicated in FIG. 5. including fixed points 42a, 42b, 42c, 42d, 42e, 42f, 42g, 42h and 42i.

Grooves cut into in rubber block 40 include groove 44 that starts from the lower edge 41-C and rises towards the horizontal center line of the block 40 at an angle that inclines gently towards the front of block 40. At the middle of block 40, groove 44 turns horizontally towards the front of rubber block 40 to form a closed end at fixed point 42f. Additionally, at the bottom rear corner of the groove 44, an indentation at fixed point 42h is formed.

A second groove 43 starts at the top edge 41-A of block 40, starting as a gentle slope downward, passing fixed point 42b, then dropping sharply, vertically, forming a short, vertical closed end at fixed point 42a.

Starting from fixed point 42b, moving towards the front of block 40, groove 43 rises and becomes a retaining edge as it reaches outer edge 41-A. Continuing forward, the retaining edge reaches outer edge 41-A at about fixed point 42d. At fixed point 42d the edge rolls sharply downwards, towards fixed point 42e along edge 41-B at the front of the rubber block 40. Fixed point 42e sits at the horizontal center line of block 40.

The sliding pegs 50 and 51 are configured laterally along the center line on the outside face of rails 21a and 21d with peg 51 nearest the far lower end of rails 21a and 21d and peg 50 a few inches in, along the lateral line, from peg 51. Pegs 50 and 51 can be formed from a variety of materials including wood, plastic and metal. Pegs 50 and 51 can also incorporate wheels or rolling surfaces to facilitate their movement through the grooves of block 40. In this discussion the sliding pegs are assumed to be made of high density plastic.

To practice the present invention, pegs 50 and 51 are assembled into the grooves, and along the edges, of block 40 thereby mechanically joining seat-deck 20 with back-deck 30.

Pegs 50 and 51 act alternately as pivot peg, moving peg or locked is peg depending on the different positions they are moved into. One of the principle mechanical features of the present invention is that pegs 50 and 51 play alternating roles, with one peg 50 or 51 moving while the other peg 50 or 51 is locked or pivots. Additionally both pegs 50 and 51 may be in motion, or may be both locked in a fixed position, at a given time.

Description of the Motion and Mechanics in one Exemplary Embodiment of the Present Invention Description of the motion and mechanics of the present invention starts with the futon frame 1 configured in the open position with seat-deck 20 and back-deck 30 laid out horizontally as a bed in an common plane, with rails 31d and 21b representing the adjacent parallel sides, and sitting over and supported by stretcher rails 8 and 9, and fitting between the stationary arm panels 10 and joined at the union of pegs 50 and 51 with the rubber block 40.

There are three positions available to the user of the futon frame 1 which are created by the relative positioning between the seat-deck 20 and back-deck 30. These three positions include "bed" (open horizontal position), "lounge" (a partially raised position allowing the user to comfortably recline) and "sofa" (the 'closed', fully upright seating position).

FIG. 9a—Position I (Bed Position)

Sliding peg 51 sits at fixed point 42f in groove 44 in rubber block 40, and is locked in place by the position of sliding peg 50 which is fixed and restrained from lateral movement due to it's contact with fixed point 42e at the front, outside edge 41-B of block 40.

In this position peg 51 is the supporting pivot peg and peg 50 is the moveable peg.

FIG. 9b—Position II (Motion Position)

Moving out of position I, the user lifts the front of seat-deck 20 radially pivoting on peg 51 and thereby moving peg 50 past it's restrained position in position I and over fixed point 42d, the upper front corner of block 40. This action unlocks peg 51 and allows peg 51 to be released downward in groove 44 without further effort from the user.

FIG. 9c—Position III (Transitional Lock Position)

Sliding peg 50 now sits in fixed point 42a, the end point of groove 43. Sliding peg 51 has exited groove 44 and is sitting in the indentation at fixed point 42h. The natural weight of seat-deck 20 causes seat-deck 20 to rotate forward slightly, pivoting on sliding peg 50, causing sliding peg 51 to lock into the indentation at fixed point 42h. This lock position restrains seat-deck 20 from further downward rotation.

In this position sliding peg 50 is the supporting pivot peg and sliding peg 51 is rotated into it's lock point at fixed point 42h.

FIG. 9d—Position IV (Levering Position)

To move from position III, through position IV, to reach position V, the user levers the front of seat-deck 20 downward. (This action uses plastic runners 34, which are fit into the grooves 14 in arm panels 10, as the pivot points). Seat-deck 20 and back-deck 30, which are locked together, are thereby rotated together as one resulting in the seat-deck 20 being levered downwards and back-deck 30 being lifted upwards (as runner 35 slides upwards in track 15).

In this position both sliding peg 50 and sliding peg 51 are locked and do not move in relation to rubber block 40.

FIG. 9e—Position V (Lounge Position)

In position V there is again no change in the relative positions of sliding pegs 50 and 51. They remain in their locked position, locking seat-deck 20 and back-deck 30 at a fixed relative angle to each other.

Once seat-deck 20 has fully rotated downward and sits on stretcher rail 8 the seating position has reached the "lounge" position.

In this position both sliding peg 50 and sliding peg 51 are still locked and do not move in relation to rubber block 40.

FIG. 9f—Position VI (Sofa Position)

To move to position VI "sofa" position from Position V "lounge" position the user pushes seat-deck 20 inwards, towards the back. This causes plastic runner 34 to roll into to its lower most position in groove 14 and also causes runner 35 to move into its uppermost position in groove 15. This brings back-deck 30 fully up to the "sofa" position.

As the seating position changes from "lounge" to "sofa" sliding peg 51 jumps across the mouth of groove 44 from fixed point 42h to fixed point 42I.

Sliding peg 50 stays in its position at fixed point 42b and is held in place due to the position of sliding peg 51, which is restrained from any forward movement due to its contact with the outer edge 41-C.

In this position sliding peg 50 is the supporting pivot point and sliding peg 51 is the moving peg.

FIG. 9g—Position VII (Release Position)

To move out of position VI "sofa" position, returning to "lounge" position (now Position VIII), the user lifts up on seat-deck 20 and pulls forward.

As the user lifts the seat-deck 20 as described above, sliding peg 51 moves further downward along outer 41-C where it continues to be restrained from forward movement and continues thereby to lock sliding peg 50, now even more tightly.

The user can now pull forward with confidence that the pegs will not slip or partially release, thereby avoiding the problems of 'early release' or 'jamming' as described in items 3 and 4 in the Background.

In this position sliding peg 50 is the supporting pivot peg and sliding peg 51 rotates lower in its locked position.

FIG. 9h—Position VIII (Levering (or Lounge) Position)

Moving from position VII to Position VIII, as seat-deck 20 moves forward and upward (rolling the plastic runners 34 back up the grooves 14 in the arm panels 10) the back-deck 30 falls, rotating downward, pivoting on sliding peg 50.

As the back-deck 30 falls, sliding peg 51 'jumps' back into the indentation at fixed point 42h, and thereby returns to the locked position. In this position the user can drop the seat-deck down onto stretcher rail 8 returning to the "lounge" position (Position V).

Or the user can continue lifting the seat-deck upward, returning to the transitional locked position (Position III and Position IX).

FIG. 9i—Position IX (Transitional Lock Position)

With sliding pegs 50 and 51 remaining in their locked position in rubber block 40, the user has lifted seat-deck 20 upward to near vertical, at the same time levered and lowered the back-deck 30, in a fully controlled drop, onto stretcher rail 9.

Position IX is identical to Position III.

FIG. 9j—Position X (Release Position)

To release the lock, the user lifts seat-deck 20 upward to release sliding peg 50 out of the end point of groove 43 at fixed point 42a, and over fixed point 42b.

Sliding peg 51 releases naturally, with the lifting of the seat-deck 20, and moves out of the indentation fixed point 42h, and moves upward along groove 44.

FIG. 9k—Position XI (Motion Position)

Position XI is a transitional motion position as the seat-deck 20 drops down to meet stretcher rail 8 and rest in the "bed" position.

As sliding peg 50 rolls over fixed point 42d and travels along the retaining edge of outer edge 41-B it naturally lifts sliding peg 51 up along groove 44. As sliding peg 50 reaches fixed point 42e it pulls sliding peg 51 tightly into its lock position at fixed point 42f. The frame has now returned to Position I.

It is noted that although the present invention has been described above as including runners, rollers, pegs, pins or other protrusions on certain elements and tracks, ledges, grooves, notches, hooks, hooks-notches or other openings, on other interacting elements, the location of the runners, rollers, pegs, or pins or other protrusions could be reversed with the positions of the tracks, ledges, grooves, notches, hooks, hooks-notches or other openings, without departing from the spirit and scope of the present invention.

As also identified above, although the present invention is generally directed to a futon sofa bed and various sub-assemblies thereof, including numerous features and variations thereof, the present invention is not to be limited by any specific combination of features and/or variations. In particular, each feature or variation thereon, may be utilized separately or in combination with any of the other features or variations described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A nut, comprising:
   a body including a threaded cylindrical hole, for receiving a corresponding threaded member, an axis of the threaded cylindrical hole being substantially transverse to a longitudinal axis of said body; and
   a protrusion, integral with said body and grippable between a thumb and forefinger, extending from said body in a longitudinal direction.

2. The nut of claim 1, wherein said body has a substantially cylindrical shape.

3. The nut of claim 2, wherein said body has a substantially barrel shape.

4. The nut of claim 1, said body and said protrusion are integral.

5. The nut of claim 1, wherein the complementary threaded member is a bolt.

6. A nut, comprising:
   a body including a threaded cylindrical hole, for receiving a corresponding threaded member, an axis of the threaded cylindrical hole being substantially transverse to a longitudinal axis of said body; and
   a protrusion, grippable between a thumb and forefinger, extending from said body in a longitudinal direction, wherein said protrusion may be manipulated to position said body so that the threaded cylindrical hole engages the threaded member, wherein said protrusion includes a base, closer to said body and a peak further from said body, wherein said base is wider than said peak.

7. The nut of claim 6, wherein said peak includes a grip portion.

8. The nut of claim 6, wherein said protrusion has a curvature from said peak to said base to facilitate gripping.

9. A nut, comprising:
   a body including a threaded cylindrical hole, for receiving a corresponding threaded member, an axis of the threaded cylindrical hole being substantially parallel to a longitudinal axis of said body; and
   a protrusion, integral with said body and grippable between a thumb and forefinger, wherein said protrusion may be manipulated to position said body so that the threaded cylindrical hole engages the threaded member.

10. The nut of claim 9, wherein said body has a substantially cylindrical shape.

11. The nut of claim 10, wherein said body has a substantially barrel shape.

12. The nut of claim 9, wherein the complementary threaded member is a bolt.

13. The nut of claim 9, wherein said protrusion includes a base, closer to said body and a peak further from said body, wherein said base is wider than said peak.

14. The nut of claim 13, wherein said peak includes a grip portion.

15. The nut of claim 13, wherein said protrusion has a curvature from said peak to said base to facilitate gripping.

16. A method of securing two members, comprising:
   inserting a threaded member into a hole in one of the two members;
   inserting a nut, including a body, including a threaded cylindrical hole, for receiving a corresponding threaded member, an axis of the threaded cylindrical hole being substantially transverse to a longitudinal axis of said body and a protrusion, integral with said body and grippable between a thumb and forefinger, extending from said body in a longitudinal direction, into a first hole in a second of the two members such that the protrusion remains substantially outside of the first hole;

inserting the threaded member into a second hole substantially perpendicular to and intersecting with the first hole in the second of the two members; and tightening the threaded member to secure the two members.

17. The method of claim 16, wherein said inserting steps regarding the second of the two members may be reversed as long as the threaded member does not substantially block the first hold in the second of the two members.

18. The method of claim 16, wherein said manipulating step includes moving the nut in and/or out along a longitudinal direction of the first hole, rotating the nut, or tilting the nut to engage the threaded member.

19. A method of securing two members, comprising:

inserting a threaded member into a hole in one of the two members;

inserting a nut, including a body, including a threaded cylindrical hole, for receiving a corresponding threaded member, an axis of the threaded cylindrical hole being substantially transverse to a longitudinal axis of said body and a protrusion, integral with said body and grippable between a thumb and forefinger, into a first hole in a second of the two members such that the protrusion remains substantially outside of the first hole;

inserting the threaded member into a second hole substantially perpendicular to and intersecting with the first hole in the second of the two members;

manipulating the protrusion to position the body of the nut so that the threaded cylindrical hole engages the threaded member; and tightening the threaded member to secure the two members.

20. The method of claim 19, wherein said inserting steps regarding the second of the two members may be reversed as long as the threaded member does not substantially block the first hold in the second of the two members.

21. The method of claim 19, wherein said manipulating step includes moving the nut in and/or out along a longitudinal direction of the first hole, rotating the nut, or tilting the nut to engage the threaded member.

* * * * *

UNITED STATES PATENT AND TRADEMARK OFFICE
CERTIFICATE OF CORRECTION

| | |
|---|---|
| PATENT NO. | : 6,457,923 B1 |
| APPLICATION NO. | : 09/760747 |
| DATED | : October 1, 2002 |
| INVENTOR(S) | : Joel Grossman |

It is certified that error appears in the above-identified patent and that said Letters Patent is hereby corrected as shown below:

Column 12, line 40, "parallel" should be changed to --transverse--.

Signed and Sealed this

Seventeenth Day of April, 2007

JON W. DUDAS
*Director of the United States Patent and Trademark Office*